(12) United States Patent
Khan et al.

(10) Patent No.: US 12,363,708 B2
(45) Date of Patent: Jul. 15, 2025

(54) ADAPTIVE ADVANCED RECEIVERS BASED ON DOWNLINK GRANT PATTERN DETECTION

(71) Applicant: QUALCOMM Incorporated, San Diego, CA (US)

(72) Inventors: Touseef Khan, San Diego, CA (US); Sitaramanjaneyulu Kanamarlapudi, San Diego, CA (US); Varun Nuggehalli Ashok, San Marcos, CA (US); Krishna Dilipbhai Patel, San Diego, CA (US); Ganesh Revanth Balasubramani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 17/944,030

(22) Filed: Sep. 13, 2022

(65) Prior Publication Data
US 2024/0089962 A1    Mar. 14, 2024

(51) Int. Cl.
*H04W 72/1273* (2023.01)
*H04W 24/08* (2009.01)
*H04W 72/23* (2023.01)

(52) U.S. Cl.
CPC ....... *H04W 72/1273* (2013.01); *H04W 24/08* (2013.01); *H04W 72/23* (2023.01)

(58) Field of Classification Search
CPC .. H04W 72/1273; H04W 24/08; H04W 72/23

USPC ........................................................ 370/329
See application file for complete search history.

(56) References Cited

U.S. PATENT DOCUMENTS

| | | | | |
|---|---|---|---|---|
| 8,428,042 | B1* | 4/2013 | Chion | H04L 1/0016 370/332 |
| 2014/0307818 | A1* | 10/2014 | Jindal | H04W 16/00 375/267 |
| 2023/0146014 | A1* | 5/2023 | Mondet | H04L 5/0048 370/329 |
| 2023/0370973 | A1* | 11/2023 | Santhanam | H04W 52/0274 |

* cited by examiner

*Primary Examiner* — Hermon Asres
(74) *Attorney, Agent, or Firm* — Holland & Hart LLP

(57) ABSTRACT

Methods, systems, and devices for wireless communications are described. Generally, the described techniques provide for a user equipment (UE) to adaptively transition between modes of an adaptive receive diversity (ARD) antenna management configuration. In some cases, the UE may determine to transition from an ARD disallowed mode to an ARD standby mode in response to receiving a burst of downlink grants. The UE may dynamically update one or more criterion for transitioning between the ARD disallowed mode and the ARD standby mode according to a pattern of received downlink grants. For example, the UE may adjust a threshold quantity of downlink grants which constitutes a burst based on a downlink scheduling rate (DSR) of one or more prior ARD standby durations. In some cases, the UE may identify a fallback condition to transition from the ARD standby mode to the ARD disallowed mode.

20 Claims, 9 Drawing Sheets

ADAPTIVE ADVANCED RECEIVERS BASED ON DOWNLINK GRANT PATTERN DETECTION

FIELD OF TECHNOLOGY

The following relates to wireless communications, including adaptive advanced receivers based on downlink grant pattern detection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support adaptive advanced receivers based on downlink grant pattern detection. For example, the described techniques provide for a user equipment (UE) to adaptively transition between modes of an adaptive receive diversity (ARD) antenna management configuration. In some cases, the UE may determine to transition from an ARD disallowed mode (e.g., during low downlink scheduling rates) to an ARD standby mode (e.g., during high downlink scheduling rates) in response to receiving a burst of downlink grants (e.g., a threshold quantity of downlink grants within a quantity of subframes). However, the pattern of downlink grants may incur relatively long durations of the UE operating in the ARD standby mode without receiving downlink scheduling (e.g., periodic bursts without intermediate transmissions), which may increase power consumption while maintaining a same downlink throughput.

Accordingly, the UE may dynamically update one or more criterion for transitioning between the ARD disallowed mode and the ARD standby mode. For example, the UE may adjust (e.g., increment) a threshold quantity of downlink grants which constitutes a burst based on a function of a downlink scheduling rate (DSR) (e.g., an average DSR, a variance of multiple DSRs) of one or more prior ARD standby durations. In some cases, the UE may identify a fallback condition, such as receiving no downlink scheduling within a quantity of subframes, to transition from the ARD standby mode to the ARD disallowed mode.

A method for wireless communications at a UE is described. The method may include communicating, during a first duration, according to an ARD standby mode based on a first set of downlink bursts received while communicating according to an ARD disallowed mode satisfying a first downlink burst threshold, communicating, during a second duration, according to the ARD disallowed mode based on a transition condition being satisfied by communications during the first duration, and communicating, during a third duration, according to the ARD standby mode based on a second set of downlink bursts received during the second duration satisfying a second downlink burst threshold, where the second downlink burst threshold is based on a function of a DSR monitored while communicating according to the ARD standby mode during the first duration.

An apparatus for wireless communications at a UE is described. The apparatus may include a processor, memory coupled with the processor, and instructions stored in the memory. The instructions may be executable by the processor to cause the apparatus to communicate, during a first duration, according to an ARD standby mode based on a first set of downlink bursts received while communicating according to an ARD disallowed mode satisfying a first downlink burst threshold, communicate, during a second duration, according to the ARD disallowed mode based on a transition condition being satisfied by communications during the first duration, and communicate, during a third duration, according to the ARD standby mode based on a second set of downlink bursts received during the second duration satisfying a second downlink burst threshold, where the second downlink burst threshold is based on a function of a DSR monitored while communicating according to the ARD standby mode during the first duration.

Another apparatus for wireless communications at a UE is described. The apparatus may include means for communicating, during a first duration, according to an ARD standby mode based on a first set of downlink bursts received while communicating according to an ARD disallowed mode satisfying a first downlink burst threshold, means for communicating, during a second duration, according to the ARD disallowed mode based on a transition condition being satisfied by communications during the first duration, and means for communicating, during a third duration, according to the ARD standby mode based on a second set of downlink bursts received during the second duration satisfying a second downlink burst threshold, where the second downlink burst threshold is based on a function of a DSR monitored while communicating according to the ARD standby mode during the first duration.

A non-transitory computer-readable medium storing code for wireless communications at a UE is described. The code may include instructions executable by a processor to communicate, during a first duration, according to an ARD standby mode based on a first set of downlink bursts received while communicating according to an ARD disallowed mode satisfying a first downlink burst threshold, communicate, during a second duration, according to the ARD disallowed mode based on a transition condition being satisfied by communications during the first duration, and communicate, during a third duration, according to the ARD standby mode based on a second set of downlink bursts received during the second duration satisfying a second downlink burst threshold, where the second downlink burst threshold is based on a function of a DSR monitored while communicating according to the ARD standby mode during the first duration.

Some examples of the method, apparatuses, and non-transitory computer-readable medium described herein may further include operations, features, means, or instructions for monitoring, during the first duration and while communicating according to the ARD standby mode, for receipt of a multi-input-multi-output (MIMO) downlink grant and the DSR and adjusting the first downlink burst threshold to the second downlink burst threshold based on receipt of the MIMO downlink grant or the function of the DSR.

In some examples of the method, apparatuses, and non-transitory computer-readable medium described herein, recording, based on transitioning from communicating during the first duration to communicating during the second duration, the DSR monitored while communicating according to the ARD standby mode during the first duration.

Some examples of the method, apparatuses, and non-transitory computer-readable medium described herein may further include operations, features, means, or instructions for determining whether a DSR of a quantity of previous durations of communicating according to the ARD standby mode satisfies a DSR threshold.

Some examples of the method, apparatuses, and non-transitory computer-readable medium described herein may further include operations, features, means, or instructions for determining, based on determining that the average downlink scheduling rate of the quantity of previous durations is less than or equal to the average downlink scheduling rate threshold, whether a downlink burst adjustment condition is satisfied.

Some examples of the method, apparatuses, and non-transitory computer-readable medium described herein may further include operations, features, means, or instructions for adjusting the first downlink burst threshold based on determining that the downlink burst adjustment condition is satisfied, where adjusting the first downlink burst threshold results in the second downlink burst threshold, and where the downlink burst adjustment condition is satisfied based on a set of additional downlink bursts received while communicating during the first duration being less than or equal to a threshold percentage of a window size comprising a set of transmission time intervals.

Some examples of the method, apparatuses, and non-transitory computer-readable medium described herein may further include operations, features, means, or instructions for using a value of the first downlink burst threshold as the value of the second downlink burst threshold based on determining that the downlink burst adjustment condition is not satisfied, where the downlink burst adjustment condition is not satisfied based on a set of additional downlink bursts received while communicating during the first duration being greater than a threshold percentage of a window size comprising a set of transmission time intervals.

Some examples of the method, apparatuses, and non-transitory computer-readable medium described herein may further include operations, features, means, or instructions for resetting the first downlink burst threshold to a default downlink burst threshold based on determining the downlink scheduling rate of the quantity of previous durations fails to satisfy the downlink burst adjustment condition, where resetting the first downlink burst threshold to the default downlink burst threshold results in the second downlink burst threshold and where the downlink burst adjustment condition is not satisfied based on the downlink scheduling rate being greater than a downlink scheduling rate threshold percentage.

Some examples of the method, apparatuses, and non-transitory computer-readable medium described herein may further include operations, features, means, or instructions for resetting, based on receiving the multi-layer MIMO downlink grant or a signal-to-noise ratio threshold being satisfied, a downlink scheduling rate corresponding to a quantity of previous durations of communicating according to the adaptive receive diversity standby mode.

Some examples of the method, apparatuses, and non-transitory computer-readable medium described herein may further include operations, features, means, or instructions for determining the signal-to-noise ratio threshold based on a quantity of active radio frequency receive chains at the UE.

Some examples of the method, apparatuses, and non-transitory computer-readable medium described herein may further include operations, features, means, or instructions for the UE activating a first quantity of radio frequency receive chains in response to communicating according to the adaptive receive diversity standby mode, the first quantity of radio frequency receive chains is associated with a increased performance of the UE.

Some examples of the method, apparatuses, and non-transitory computer-readable medium described herein may further include operations, features, means, or instructions for the UE activating a second quantity of radio frequency receive chains in response with communicating according to the adaptive receive diversity disallowed mode, the second quantity of radio frequency receive chains is associated with a baseline performance of the UE.

Some examples of the method, apparatuses, and non-transitory computer-readable medium described herein may further include operations, features, means, or instructions for evaluating whether the transition condition is satisfied based on a scheduling criteria monitored during a quantity of transmission time intervals while communicating according to the adaptive receive diversity standby mode.

Some examples of the method, apparatuses, and non-transitory computer-readable medium described herein may further include operations, features, means, or instructions for the scheduling criteria being based on the downlink scheduling rate over the quantity of transmission time intervals or a quantity of downlink grants received over the quantity of transmission time intervals.

Some examples of the method, apparatuses, and non-transitory computer-readable medium described herein may further include operations, features, means, or instructions for the function of the downlink scheduling rate being an average of the downlink scheduling rate, a variance of the downlink scheduling rate, or both.

DETAILED DESCRIPTION

Figure 1:
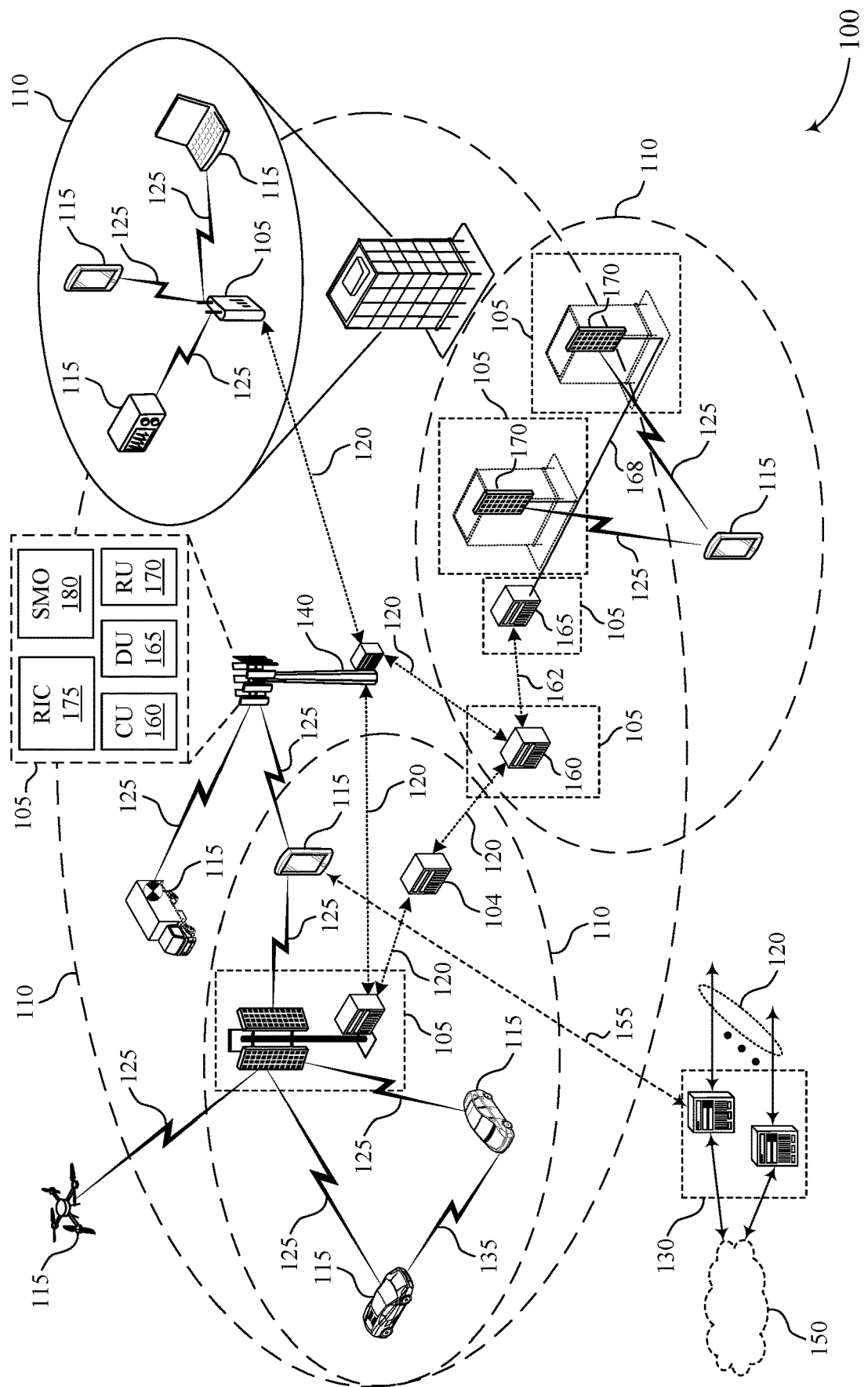
FIG. 1 illustrates an example of a wireless communications system that supports adaptive advanced receivers based on downlink grant pattern detection in accordance with one or more aspects of the present disclosure.

In some wireless communications systems, a wireless device may include multiple antennas for performing communications. In some examples, a user equipment (UE) may activate various subsets of the set of antennas according to an adaptive receive diversity (ARD) mode. The UE may transition between one or more receive modes (e.g., an ARD standby mode, an ARD disallowed mode, or an ARD sleep mode) in response to conditions of a wireless channel (e.g., radio frequency (RF) conditions), a downlink traffic pattern of the network entity, or both. For example, the UE may transition from an ARD disallowed mode (e.g., for receiving relatively low amounts of downlink traffic) to an ARD standby mode (e.g., for receiving relatively high amounts of downlink traffic) based on downlink traffic patterns. That is, the UE may transition from the ARD disallowed mode to the ARD standby mode based on receiving a threshold quantity of downlink grants within a quantity of subframes (e.g., a burst). The UE may transition between the modes to support reduced power consumption (e.g., by turning off receive antennas).

In some examples, the pattern of downlink grants may cause the UE to remain in the ARD standby mode (e.g., with high receive antenna activity) for relatively long durations. For example, the UE may identify a burst as a threshold quantity downlink grants within a threshold quantity of consecutive subframes, and may transition to the ARD standby mode until a low-scheduling criteria has been satisfied (e.g., less than a threshold percentage of scheduling over a moving window). However, the downlink scheduling pattern may include periodic bursts without intermediate transmissions. Thus, the UE may transition to the ARD standby mode in response to detecting a burst (e.g., according to a static threshold), and may remain in the ARD standby mode for a duration (e.g., until the low-scheduling criteria has been satisfied) despite not receiving communications until the next burst, thereby consuming increased power while maintaining a same downlink throughput.

To support dynamic transitions between ARD modes, a UE may evaluate one or more scheduling rates corresponding to respective ARD standby durations. In other words, the UE may perform a function of a downlink scheduling rate (DSR) in response to exiting the ARD standby mode, and may adjust a criterion for transitioning to the ARD disallowed state based on an evaluation of the DSR for a current ARD standby duration and one or more prior ARD standby durations. For example, the UE may identify a quantity of consecutive ARD standby mode scheduling rates that do not exceed a threshold scheduling rate, and may determine to adjust (e.g., increase) a threshold quantity of downlink scheduling grants which constitutes a burst (e.g., a dynamic threshold). By adjusting the burst threshold, the UE may refrain from transitioning from the ARD disallowed state to the ARD standby state due to the scheduling pattern of the network entity no longer satisfying the burst threshold. Additionally, or alternatively, the UE may identify a fallback condition (e.g., receiving no signaling within a threshold quantity of subframes) to transition to the ARD disallowed state. Thus, the UE may transition from the ARD standby mode to the ARD disallowed mode early (e.g., before the scheduling rate satisfies the low-scheduling criteria) to decrease power consumption at the UE while maintaining a same downlink throughput.

Aspects of the disclosure are initially described in the context of wireless communications systems. Aspects of the disclosure are further illustrated by and described with reference to flowcharts and process flows. Aspects of the disclosure are further illustrated by and described with reference to apparatus diagrams, system diagrams, and flowcharts that relate to adaptive advanced receivers based on downlink grant pattern detection.

FIG. 1 illustrates an example of a wireless communications system 100 that supports adaptive advanced receivers based on downlink grant pattern detection in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support adaptive advanced receivers based on downlink grant pattern detection as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers)

compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples of the wireless communications system 100, a UE 115 may operate a set of antennas according to an ARD mode based on a pattern of downlink grants received from a network entity 105. In some cases, the UE 115 may determine to transition from an ARD disallowed mode (e.g., for receiving low downlink traffic) to an ARD standby mode (e.g., for receiving high downlink traffic) in response to receiving a burst of downlink grants (e.g., a threshold quantity of downlink grants within a quantity of subframes). However, the pattern of downlink grants may incur relatively long durations of the UE 115 operating in the ARD standby mode without receiving downlink scheduling (e.g., periodic bursts without intermediate transmissions), which may increase power consumption while maintaining a same downlink throughput. Accordingly, the UE 115 may dynamically update one or more criterion for transitioning between the ARD disallowed mode and the ARD standby mode. For example, the UE 115 may adjust (e.g., increase) a threshold quantity of downlink grants which constitutes a burst based on a DSR (e.g., an average DSR below a threshold) or variance in scheduling rate of one or more prior ARD standby durations. In some cases, the UE 115 may identify a fallback condition, such as receiving no downlink scheduling within a quantity of subframes, to transition from the ARD standby mode to the ARD disallowed mode.

Figure 2:
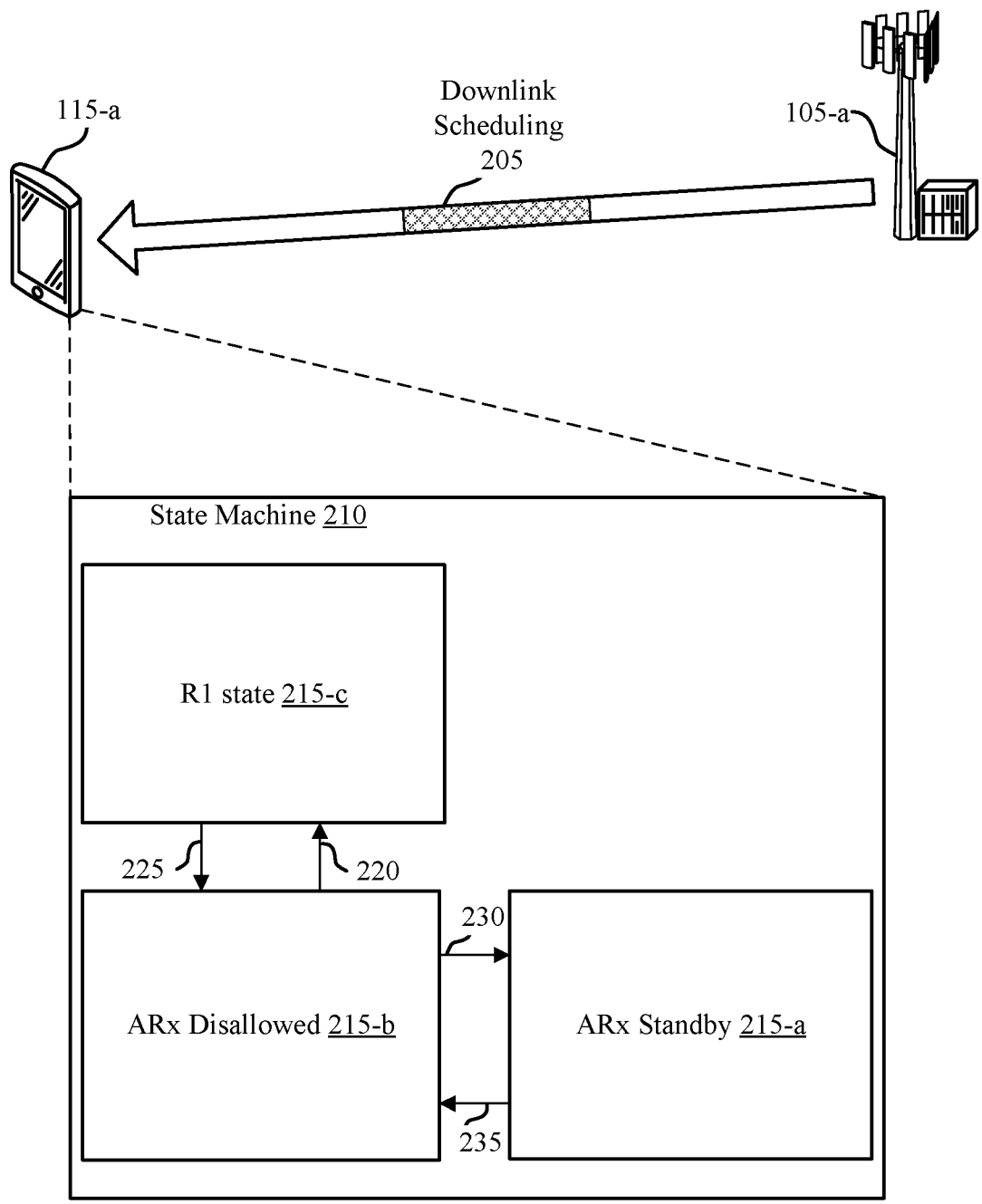
FIG. 2 illustrates an example of a wireless communications system that supports adaptive advanced receivers based on downlink grant pattern detection in accordance with one or more aspects of the present disclosure.

FIG. 2 illustrates an example of a wireless communications system 200 that supports adaptive advanced receivers based on downlink grant pattern detection in accordance with one or more aspects of the present disclosure. In some cases, the wireless communications system 200 may implement aspects of the wireless communications system 100. For example, the wireless communications system 200 may include a UE 115-a and a network entity 105-a, which may be respective examples of a UE 115 and a network entity 105 as described with reference to FIG. 1. In some examples, the network entity 105-a may transmit downlink scheduling 205 to the UE 115-a, which may operate according to an ARD antenna management configuration. That is, the UE 115-a may manage a quantity of active receive antennas (e.g., a set of antennas, a set of antenna chains, a set of antenna arrays) according to the downlink scheduling 205 and a state machine 210. The state machine 210 may include one or more states (e.g., modes), such as an advanced receiver (ARx) standby state 215-a, an ARx disallowed state 215-b, and a R1 state 215-c. In some examples, transitioning between the one or more states of the state machine 210 may be associated with power consumption, performance, or both at the UE 115-a (e.g., improving a power-to-performance trade-off for the UE 115-a). In some cases, the state machine 210 may correspond to an active component carrier (CC) (e.g., runs independently for each CC of a set of CCs).

In some examples, the UE 115-a may evaluate one or more communication metrics to determine a subsequent operating state. In other words, the UE 115-a may remain in a current state, or may transition to a different state based on a downlink scheduling rate, downlink scheduling pattern, a received reference signal power (RSRP) measurement, a signal-to-noise ratio (SNR) measurement, a spectral efficiency of a wireless network, an antenna correlation of the UE 115-a, or any combination thereof. Additionally, or alternatively, in response to determining a subsequent state, the UE 115-a may report a highest reception readiness (e.g., a highest quantity of active antennas according to the determined state) to the network entity 105-a. In some cases, such a report may be communicated via a rank indicator (RI) report, or may be indicated via one or more channel state feedback (CSF) metrics (e.g., a cannel state information (CSI) report).

In some cases, the state machine 210 may include macro states, such as the ARx standby state 215-a associated with a first quantity (e.g., two or more or two antennas identified for operating efficiently for current channel conditions) of active antennas for maximum or increased UE performance, the ARx disallowed state 215-b associated with a second quantity of active antennas (e.g., one or two) for baseline UE performance, and the R1 state 215-c associated with a quantity (e.g., one) of active antennas for minimum UE performance, each of which may correspond to a current (or expected) volume of downlink traffic. It should be understood that various other modes may be included in the state machine 210 and/or that each mode may correspond to a different quantity of radio-frequency receive chains. For example, the UE 115-a may determine to operate in the ARx standby state 215-a (e.g., supporting a relatively high quantity of active antennas) when the UE 115-a expects to receive significant downlink traffic, and may determine to operate in the ARx disallowed state 215-b (e.g., supporting a relatively low quantity of active antennas) when the UE 115-a expects a low downlink scheduling rate. The UE 115-a may additionally determine to operate according to the R1 state 215-c (e.g., supporting a lowest quantity of active antennas) in response to identifying significantly low (e.g., trivial) downlink traffic, and may adjust CSF reporting to rank 1 (e.g., via a RI report).

Additionally, one or more of the macro states of the state machine 210 may include one or more modes for managing active receive antennas within a macro state. That is, a macro state of the state machine 210 may include different modes or sub-states which may correspond to a quantity of active antennas within a state 215 or operating mode within a state 215. The UE may transition between the sub-states of a macro state based on various traffic conditions. R1 state 215-cR1 state 215-cR1 state 215-c To support adaptive antenna selection, the UE 115-a may transition between the macro states of the state machine 210 in response to a network configuration, RF conditions of a wireless channel (e.g., associated with the downlink scheduling 205), the downlink scheduling 205, or any combination thereof. For example, the UE 115-a may transition from the ARx disallowed state 215-b to the R1 state 215-c (e.g., a transition 220) in response to identifying a significantly low (e.g., trivial) downlink utilization with respect to downlink scheduling (e.g., a downlink scheduling rate). In some cases, the UE 115-a may transition from the R1 state 215-c to the ARx disallowed state 215-b (e.g., a transition 225) in response to identifying a relatively higher downlink scheduling rate (e.g., non-trivial downlink utilization), in response to receiving a downlink grant higher than R1 (e.g., a rank two (R2) downlink grant), or both.

In some examples, the UE 115-a may transition from the ARx disallowed state 215-b to the ARx standby state 215-a (e.g., a transition 230) in response to identifying a four-layer downlink multi-in multi-out (MIMO) network configuration (e.g., a grant for a MIMO uplink or downlink transmission), in response to measuring an SNR below a threshold value (e.g., as part of a radio link monitoring (RLM) procedure), or both. Additionally, or alternatively, the UE 115-a may transition from the ARx disallowed state 215-b to the ARx standby state 215-a based on receiving a threshold quantity of downlink grants within a quantity of subframes (e.g., a burst). For example, the UE 115-a may perform the transition 230 in response to receiving a threshold quantity of downlink grants (e.g., a static threshold) within a threshold quantity of consecutive subframes, due to an expectation of increased downlink traffic. In some examples, the UE 115-a may transition from the ARx standby state 215-a to the ARx disallowed state 215-b (e.g., a transition 235) in response to identifying a downlink scheduling rate satisfies a low scheduling criteria. For example, the UE 115-a may monitor a moving window (e.g., a 200 ms window) to evaluate a recent downlink scheduling rate and compare the recent downlink scheduling rate to a low scheduling threshold value to determine to perform the transition 235.

In some cases, however, a pattern of downlink grants may result in the UE 115-a frequently transitioning between the ARx disallowed state 215-b and the ARx standby state 215-a. For example, the downlink scheduling pattern may include periodic bursts (e.g., a quantity of consecutive downlink grants every 256 ms), satisfying the criteria to perform transition 230, without intermediate transmissions. Thus, the UE 115-a may transition to the ARx standby state 215-a in response to detecting a burst (e.g., according to the static threshold), and may remain in the ARx standby state 215-a for a duration (e.g., until the low-scheduling criteria has been satisfied) despite not receiving communications until the next burst, thereby consuming increased power while maintaining a same downlink throughput.

To support dynamic transitions between states of the state machine 210, the UE 115-a may evaluate one or more scheduling rates corresponding to respective durations in the ARx standby state 215-a. In other words, the UE may evaluate a function of a downlink scheduling rate (DSR) in response to exiting the ARx standby state 215-a, and may adjust a criterion (e.g., a dynamic threshold) for transitioning to the ARx disallowed state 215-b based on an evaluation of the scheduling rate for a current ARx standby state 215-a duration and one or more prior ARx standby state 215-a durations, as described in further detail herein.

Figure 3:
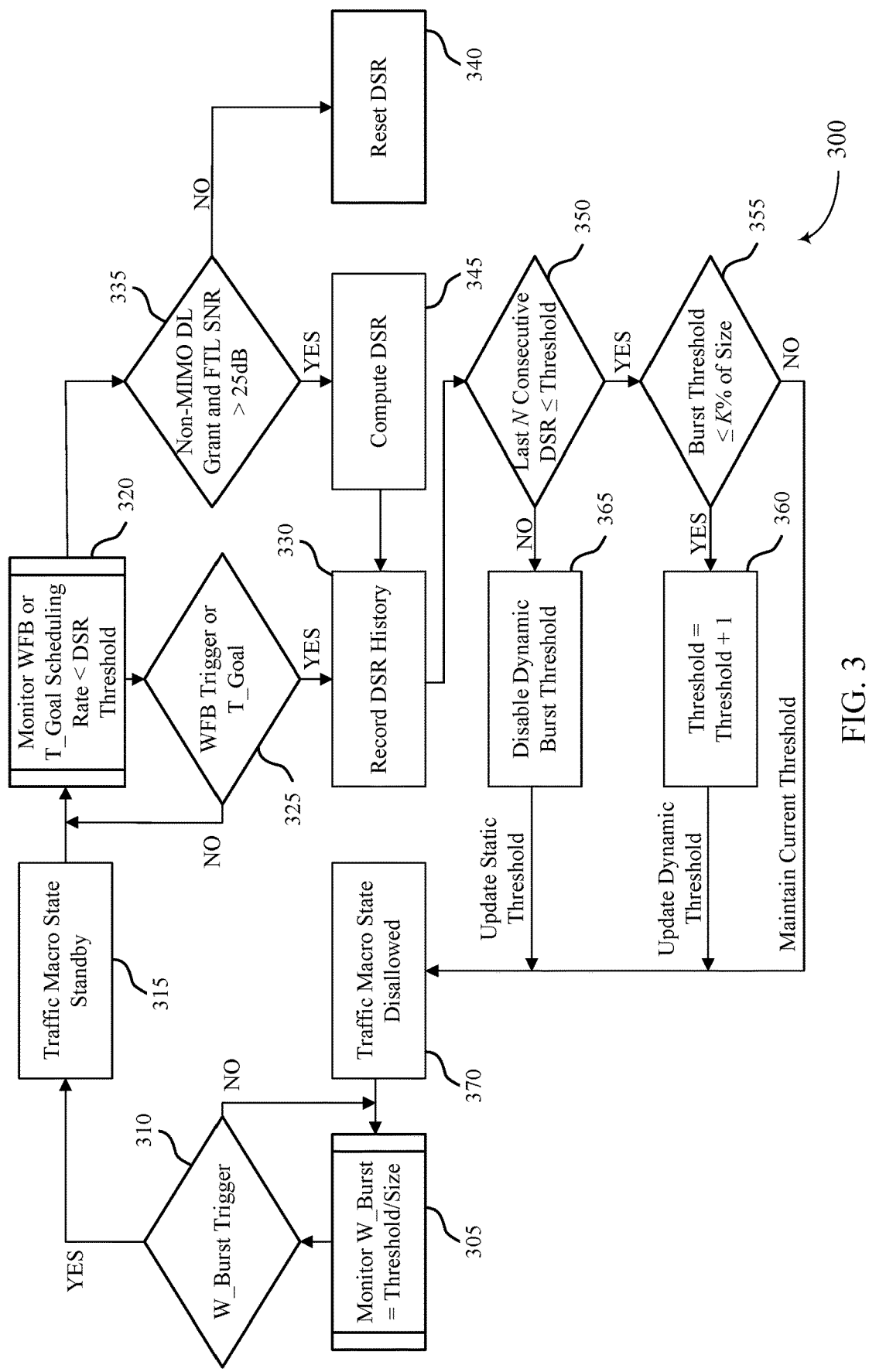
FIG. 3 illustrates an example of a flowchart that supports adaptive advanced receivers based on downlink grant pattern detection in accordance with one or more aspects of the present disclosure.

FIG. 3 illustrates an example of a flowchart 300 that supports adaptive advanced receivers based on downlink grant pattern detection in accordance with one or more aspects of the present disclosure. Aspects of the flowchart 300 may be implemented by aspects of the wireless communications system 200 and the wireless communications system 100. For example, the flowchart 300 may be implemented by a UE 115 (e.g., the UE 115-a) operating the state machine 210, as described with reference to FIG. 2. In some examples, the flowchart 300 may support a dynamic threshold to transition between ARD modes, such as the burst threshold to perform the transition 230, as described with reference to FIG. 2.

At 305, the UE 115 may operate in an ARD disallowed mode, and may monitor a wireless channel for downlink scheduling over a window. For example, the UE 115 may identify a window-burst (W_Burst) value, which may be a quantity of received downlink grants divided by a size of the window. That is, the UE 115 may monitor the wireless channel to determine the current W_Burst.

At 310, the UE 115 may compare the current W_Burst to a burst threshold to determine if a W_Burst trigger has been satisfied. In some cases, the UE 115 may determine that the current W_Burst does not satisfy the W_Burst trigger. For example, the UE 115 may identify a burst threshold of downlink grants within a burst window, and may identify receiving less than the burst threshold downlink grants within the burst window. In such examples, the UE 115 may return to 305 and continue to monitor the wireless channel.

Additionally, or alternatively, the UE 115 may determine that the current W_Burst satisfies the W_Burst trigger (e.g., receiving a quantity of downlink grants greater than or equal to the burst threshold within the burst window), and may transition from the ARD disallowed mode in response to detecting a burst.

At 315, the UE 115 may transition to an ARD standby mode in response to detecting a burst. The ARD standby mode may be an example of the ARx standby state 215-a as described with reference to FIG. 2, and may be associated with activating a high quantity of antennas at the UE 115.

At 320, the UE 115 may operate in the ARD standby mode and monitor the wireless channel. In some cases, the UE 115 may evaluate one or more metrics to transition back to the ARD disallowed mode. In some cases, such as when the UE 115 operates relatively close to a network entity 105 (e.g., a near cell or mid-cell case), the UE 115 may additionally monitor for non-MIMO grants and conditions of the wireless channel to determine whether to transition to the ARD disallowed state.

At 325, the UE 115 may check for one or more criteria to transition back to the ARD disallowed mode. In some cases, the UE 115 may monitor a fallback window (WFB) to identify whether a fallback trigger has been met, such as receiving no downlink scheduling in a prior quantity of subframes (e.g., no downlink grants in forty-eight consecutive subframes). For example, if the UE 115 identifies that the fallback trigger has been met, the UE 115 may determine to transition to the ARD disallowed mode (e.g., instead of transitioning to a fallback mode within the ARD standby mode). The UE 115 may therefore terminate an ARD standby duration early in response to receiving no downlink scheduling for a duration. Additionally, the UE 115 may monitor for a low scheduling criteria to determine to transition to the ARD disallowed mode using techniques described with reference to FIG. 2. Otherwise, if the UE 115 identifies that the fallback trigger has not been met (e.g., a downlink grant has been received in the fallback window) and the low-scheduling criteria has not been satisfied, the UE 115 may remain in the ARD standby mode and return to 320.

At 330, the UE 115 may record a downlink scheduling rate (DSR) history (e.g., an average DSR) in response to determining that the fallback trigger has been met. That is, the UE 115 may calculate the DSR for a current ARD standby duration based on the quantity of downlink scheduling and a length of the duration, and may maintain a record of one or more DSRs.

Alternatively, at 320, the UE 115 may receive a non-MIMO downlink grant and may transition to 335. At 335, the UE 115 may determine to transition to the ARD disallowed mode (e.g., due to less active antennas satisfying non-MIMO communications), and may evaluate one or more channel characteristics of the wireless channel. For example, the UE 115 may measure a frequency tracking loop (FTL) SNR of the wireless channel, and compare the measurement to a threshold value (e.g., 25 dB).

At 340, the UE 115 may reset a current DSR in response to determining the FTL SNR measurement does not exceed the threshold value. The UE 115 may then transition to the ARD disallowed mode.

Alternatively, if the UE 115 determines that the FTL SNR measurement satisfies the threshold value, the UE 115 may transition to 345. At 345, the UE 115 may compute a function of the DSR for the current ARD standby duration, and may record the DSR in the DSR history, as described at 330.

At 350, the UE 115 may evaluate a last N consecutive DSRs using the DSR history and compare the DSRs to a threshold DSR. For example, the UE 115 may evaluate the last three DSR values corresponding to the last three ARD standby durations. In such examples, the UE 115 may compare each of the DSR values to a threshold DSR value. In some examples, rather than comparing the DSRs to the threshold, the UE 115 may apply a function related to downlink scheduling, such as variance or an average of another aspect of downlink scheduling. The result of the function may be compared to a threshold, which may be adapted depending on the metrics and function used.

At 355, the UE 115 may compare the burst threshold to the size of the burst window in response to determining that the last N consecutive DSR values were under the DSR threshold (or based on using the function, as described herein). For example, the UE 115 may check if the burst threshold is less than K % of the burst window size.

At 360, the UE 115 may adjust (e.g., increment) the burst threshold value in response to determining that the burst threshold does not exceed the threshold percentage of the size of the burst window. The UE 115 may then transition to the ARD disallowed mode. By incrementing or adjusting the burst threshold, the UE 115 may transition to the ARD standby mode less frequently due to a more stringent transition criterion. In some examples, rather than incrementing the burst threshold value (e.g., by one), the UE 115 may adjust the burst threshold value by more than one.

Alternatively, at 355, the UE 115 may determine that the burst threshold does exceed the threshold percentage of the size of the burst window, and may transition to ARD disallowed mode while maintaining a current burst threshold value.

Alternatively, at 350, the UE 115 may determine that one or more of the last N consecutive DSR values exceed the DSR threshold. In such examples, at 365, the UE 115 may disable the dynamic burst threshold (e.g., an adjustable burst threshold), and may reset the burst threshold to the previously-defined static burst threshold (e.g., a default threshold). The UE 115 may disable the dynamic burst threshold (e.g., return to the default threshold) in response to applying the function, as described herein, to downlink communication metrics and comparing a result of the function (e.g., a variance) to another threshold.

At 370, the UE 115 may transition to the ARD disallowed mode, and may return to 305 and continue to monitor the wireless channel for data bursts. In the ARD disallowed mode, the UE 115 may use the modified or default burst threshold to determine whether to retransition to the ARD standby mode.

Figure 4:
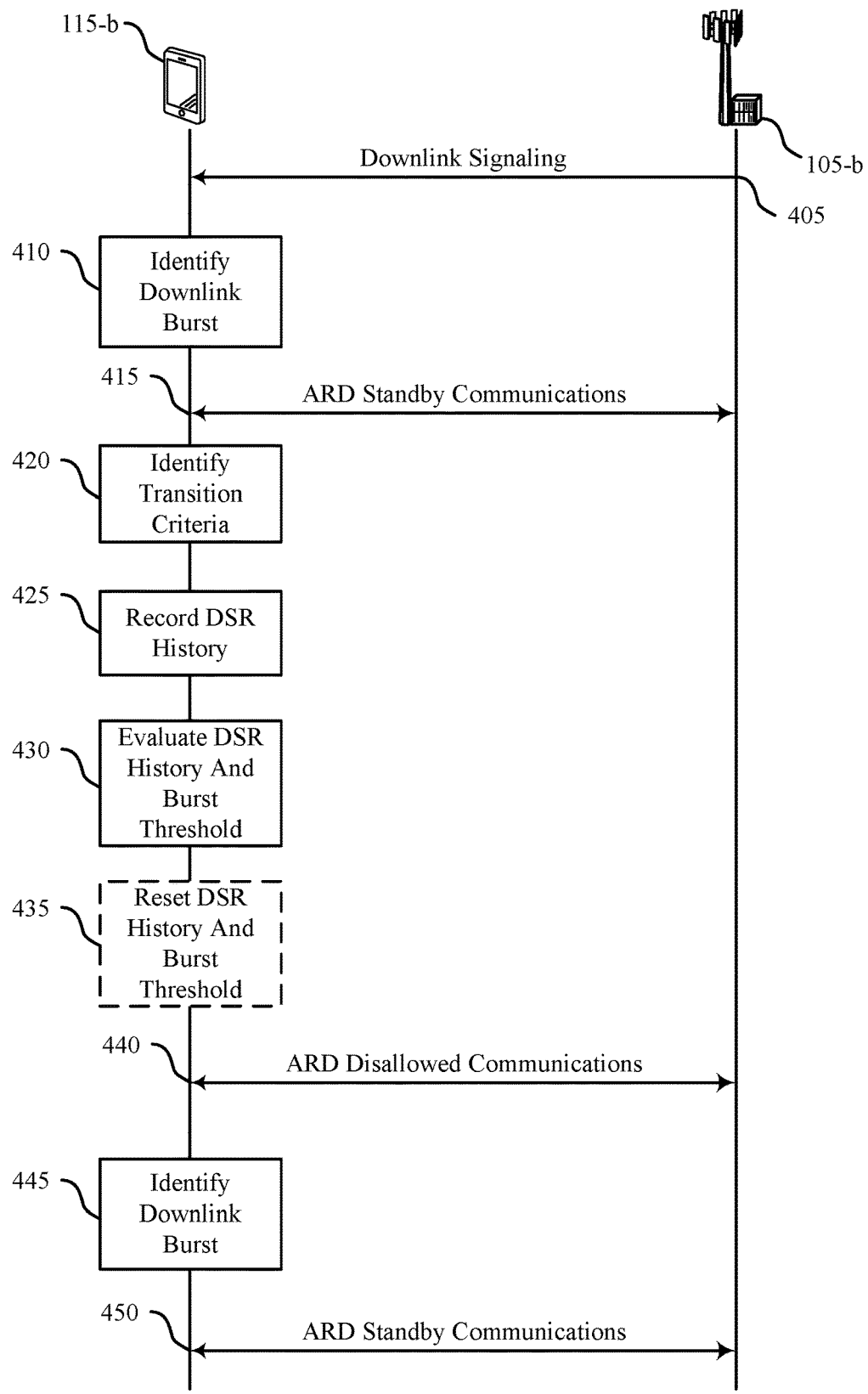
FIG. 4 illustrates an example of a process flow that supports adaptive advanced receivers based on downlink grant pattern detection in accordance with one or more aspects of the present disclosure.

FIG. 4 illustrates an example of a process flow 400 that supports adaptive advanced receivers based on downlink grant pattern detection in accordance with one or more aspects of the present disclosure. The process flow 400 may implement aspects of the wireless communications system 100, the wireless communications system 200, and the flowchart 300. In some examples, the process flow 400 may illustrate an example of a UE 115-b, which may operate in various ARD modes to support communications with a network entity 105-b. For example, the UE 115-b and the network entity 105-b may be examples of the UE 115-a and the network entity 105-a, as described with reference to FIG. 2. Alternative examples of the following may be implemented, where some processes are performed in a different order than described or are not performed. In some cases, processes may include additional features not mentioned below, or further processes may be added.

At 405, the network entity 105-b may transmit downlink scheduling to the UE 115-b. In some examples, at 405, the UE 115-b may operate according an ARD disallowed mode, which may be associated with the UE 115-b activating relatively less receive antennas.

At 410, the UE 115-b may identify a downlink burst based on the downlink scheduling from the network entity 105-b. That is, the UE 115-b may identify a first downlink burst threshold, which may define a threshold quantity of downlink grants received within a quantity of subframes. The UE 115-b may identify that this burst threshold has been satisfied, and may determine to transition from the ARD disallowed mode to an ARD standby mode to support relatively higher downlink traffic.

At 415, the UE 115-b may communicate, during a first duration, with the network entity 105-b according to the ARD standby mode based on identifying a downlink burst. For example, the UE 115-b, while operating according to the ARD disallowed mode, may receive a first set of downlink bursts which satisfy the first downlink burst threshold.

At 420, the UE 115-b may identify a transition criteria for transition back to the ARD disallowed mode has been satisfied. For example, the UE 115-b may identify that a low scheduling criteria (e.g., a scheduling rate under a threshold value) has been met. Additionally, or alternatively, the UE 115-b may receive a non-MIMO downlink grant, and may determine to transition between ARD modes based on the non-MIMO downlink grant. In some other cases, the UE 115-b may identify a fallback condition has been met, such as receiving no downlink scheduling over a quantity of consecutive subframes, and may determine to transition between ARD modes based on the fallback condition (e.g., instead of transition to a fallback state within the ARD standby mode).

At 425, the UE 115-b may record a DSR associated with a current ARD standby mode in a DSR history (e.g., maintained by the UE 115-b). For example, the UE 115-b may add the current DSR to a list of one or more prior DSR values.

At 430, the UE 115-b may evaluate the DSR history, and may adjust the burst threshold based on the evaluation. For example, the UE 115-*b* may determine that a DSR of a quantity of previous ARD standby modes is less than or equal to a DSR threshold value. In such examples, the UE 115-*b* may increment the burst threshold, thereby increasing the threshold quantity of grants which constitutes a burst. In some cases, the UE 115-*b* may refrain from adjusting (e.g., incrementing) the burst threshold due to a burst adjustment criteria not being met, such as the burst threshold being within a threshold percentage of a size of a burst window. Alternatively, the UE 115-*b* may apply a function related to downlink scheduling, such as variance or an average of another aspect of downlink scheduling. The result of the function may be compared to a threshold, which may be adapted depending on the metrics and function used. The UE 115-*b* may use the comparison to determine whether the burst threshold should be adjusted (e.g., incremented or reset) or maintained.

At 435, the UE 115-*b* may optionally determine to reset the burst threshold to a default value based on at least one DSR of the quantity of previous ARD standby modes being equal to or greater than the DSR threshold value. Additionally, the UE 115-*b* may make this determination due to receiving a non-MIMO downlink grant and measuring an SNR below a threshold value.

At 440, the UE 115-*b* may communicate, during a second duration, with the network entity 105-*b* according to the ARD disallowed mode. The UE 115-*b* may remain in the ARD disallowed mode until a burst is detected according to a current burst threshold value.

At 445, the UE 115-*b* may identify a downlink burst based on a current burst threshold value. For example, the UE 115-*b* may receive a second set of downlink grants which satisfy a second downlink burst threshold (e.g., an updated burst threshold). In some examples, the second downlink burst threshold is based on a function of a downlink scheduling rate monitored while communicating according to the ARD standby mode during the first duration.

At 450, the UE 115-*b* may communicate, during a third duration, with the network entity 105-*b* according to the ARD standby mode based on receiving the second set of downlink grants. The UE 115-*b* may reperform the operations at 420 through 435 in accordance with communications according to the ARD standby mode.

Figure 5:
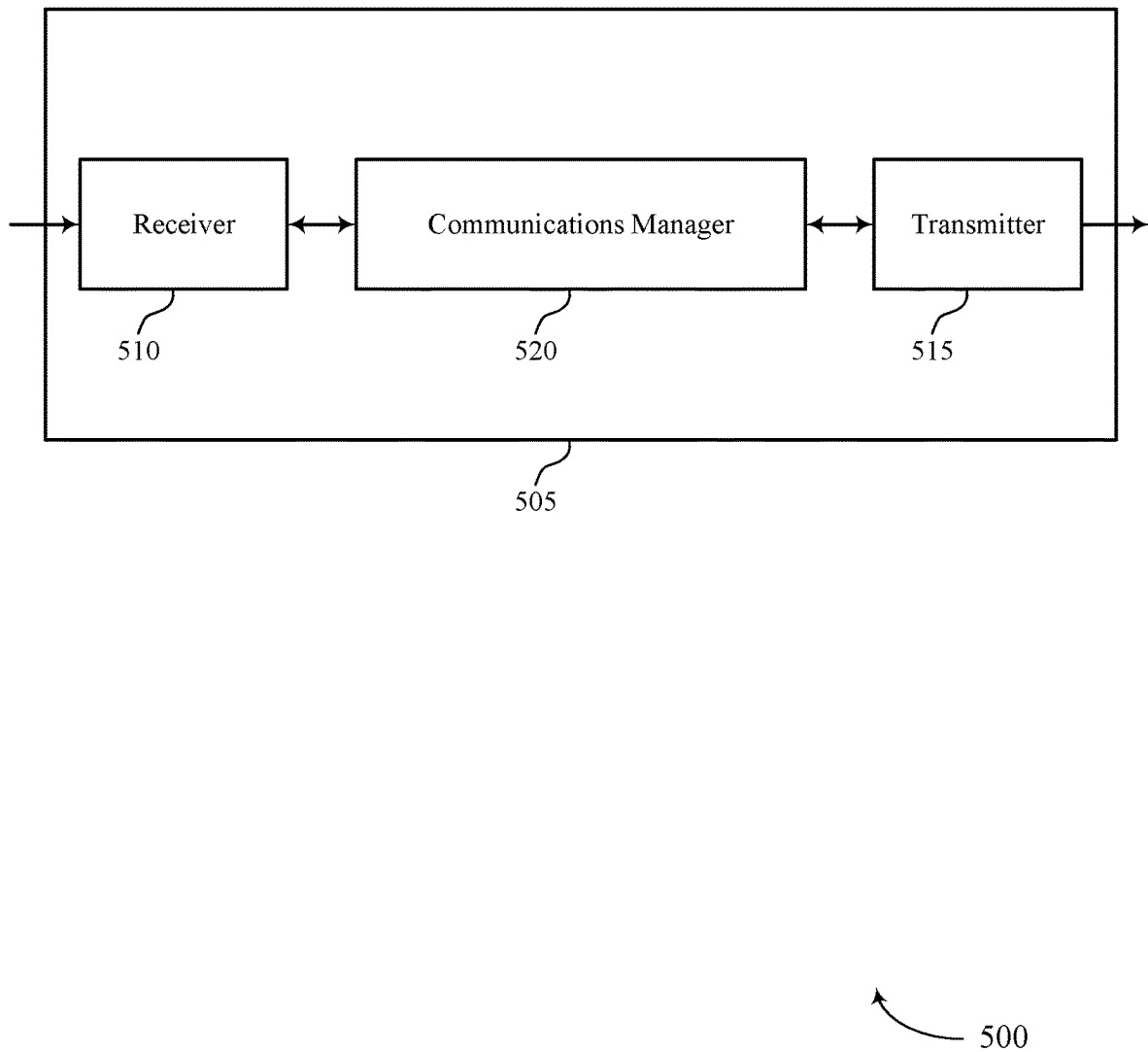
FIGS. 5 and 6 show block diagrams of devices that support adaptive advanced receivers based on downlink grant pattern detection in accordance with one or more aspects of the present disclosure.

FIG. 5 shows a block diagram 500 of a device 505 that supports adaptive advanced receivers based on downlink grant pattern detection in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to adaptive advanced receivers based on downlink grant pattern detection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to adaptive advanced receivers based on downlink grant pattern detection). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of adaptive advanced receivers based on downlink grant pattern detection as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for communicating, during a first duration, according to an adaptive receive diversity standby mode based on a first set of downlink bursts received while communicating according to an adaptive receive diversity disallowed mode satisfying a first downlink burst threshold. The communications manager 520 may be configured as or otherwise support a means for communicating, during a second duration, according to the adaptive receive diversity disallowed mode based on a transition condition being satisfied by communications during the first duration. The communications manager 520 may be configured as or otherwise support a means for communicating, during a third duration, according to the adaptive receive diversity standby mode based on a second set of downlink bursts received during the second duration satisfying a second downlink burst threshold, where the second downlink burst threshold is based on a function of a downlink scheduling rate monitored while communicating according to the adaptive receive diversity standby mode during the first duration.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for adaptively adjusting ARD transition criteria, thereby reducing power consumption of a wireless device while maintaining a same downlink throughput.

Figure 6:
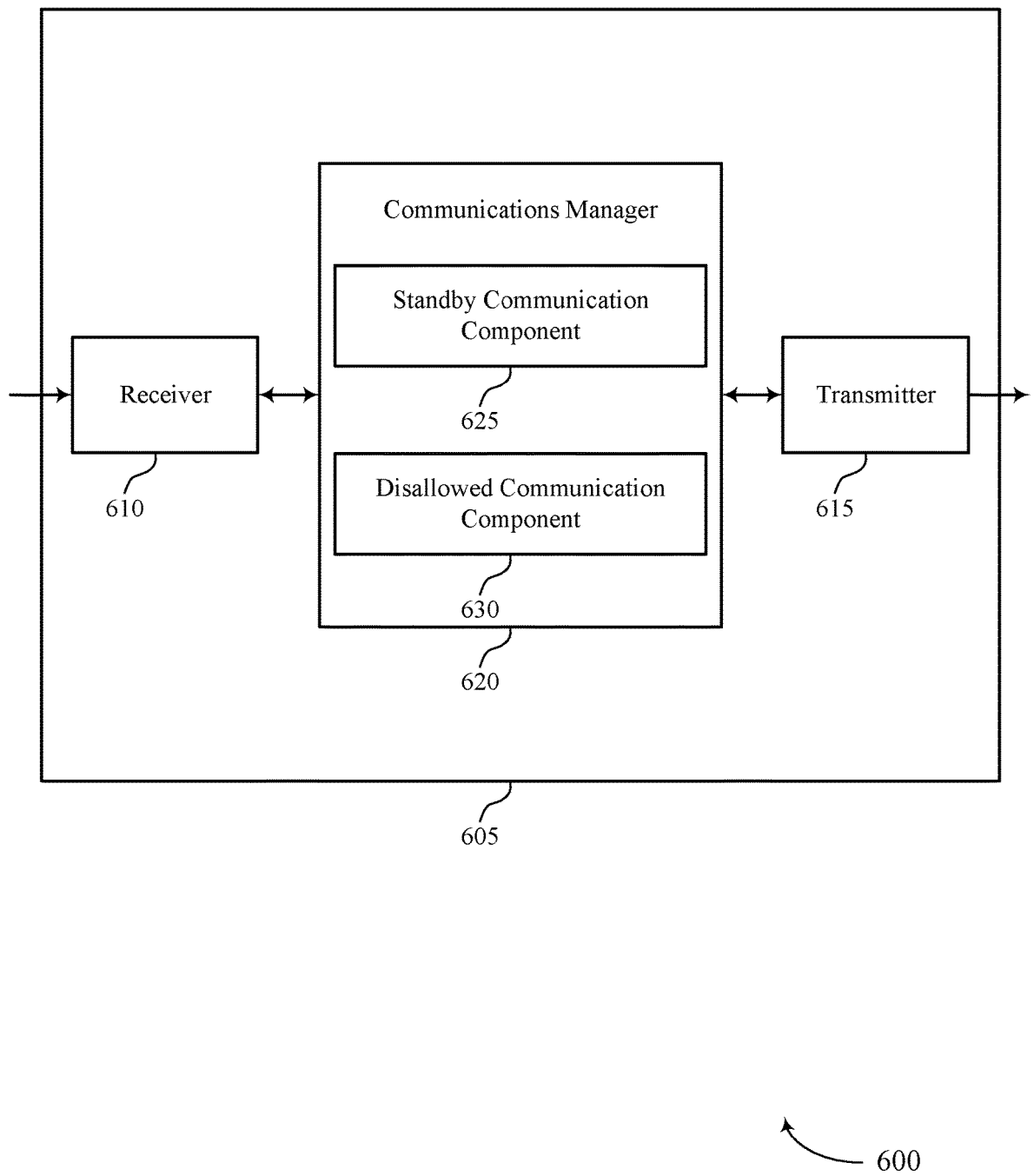

FIG. 6 shows a block diagram 600 of a device 605 that supports adaptive advanced receivers based on downlink grant pattern detection in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to adaptive advanced receivers based on downlink grant pattern detection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to adaptive advanced receivers based on downlink grant pattern detection). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of adaptive advanced receivers based on downlink grant pattern detection as described herein. For example, the communications manager 620 may include a standby communication component 625 a disallowed communication component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The standby communication component 625 may be configured as or otherwise support a means for communicating, during a first duration, according to an adaptive receive diversity standby mode based on a first set of downlink bursts received while communicating according to an adaptive receive diversity disallowed mode satisfying a first downlink burst threshold. The disallowed communication component 630 may be configured as or otherwise support a means for communicating, during a second duration, according to the adaptive receive diversity disallowed mode based on a transition condition being satisfied by communications during the first duration. The standby communication component 625 may be configured as or otherwise support a means for communicating, during a third duration, according to the adaptive receive diversity standby mode based on a second set of downlink bursts received during the second duration satisfying a second downlink burst threshold, where the second downlink burst threshold is based on a function of a downlink scheduling rate monitored while communicating according to the adaptive receive diversity standby mode during the first duration.

Figure 7:
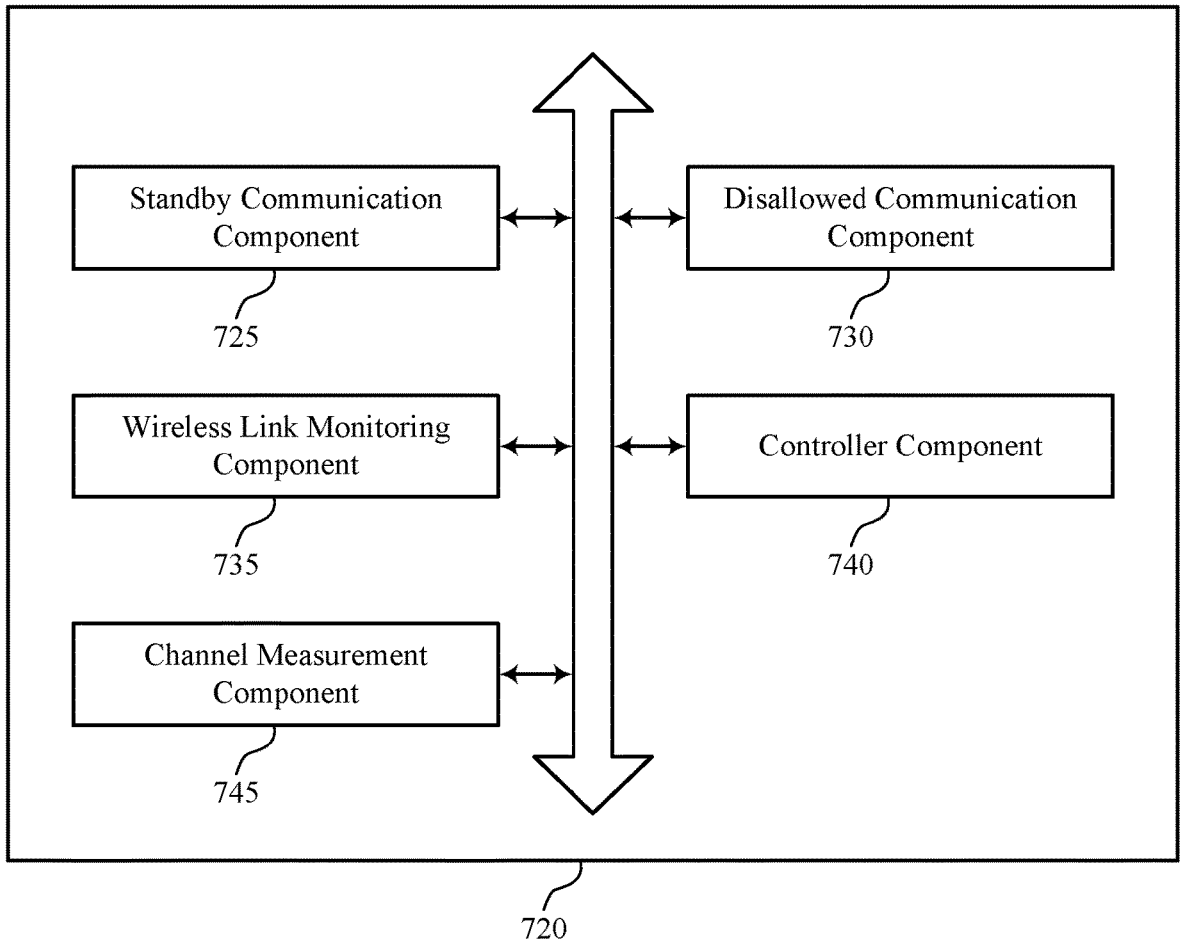
FIG. 7 shows a block diagram of a communications manager that supports adaptive advanced receivers based on downlink grant pattern detection in accordance with one or more aspects of the present disclosure.

FIG. 7 shows a block diagram 700 of a communications manager 720 that supports adaptive advanced receivers based on downlink grant pattern detection in accordance with one or more aspects of the present disclosure. The communications manager 720 may be an example of aspects of a communications manager 520, a communications manager 620, or both, as described herein. The communications manager 720, or various components thereof, may be an example of means for performing various aspects of adaptive advanced receivers based on downlink grant pattern detection as described herein. For example, the communications manager 720 may include a standby communication component 725, a disallowed communication component 730, a wireless link monitoring component 735, a controller component 740, a channel measurement component 745, or any combination thereof. Each of these components may communicate, directly or indirectly, with one another (e.g., via one or more buses).

The communications manager 720 may support wireless communications at a UE in accordance with examples as disclosed herein. The standby communication component 725 may be configured as or otherwise support a means for communicating, during a first duration, according to an adaptive receive diversity standby mode based on a first set of downlink bursts received while communicating according to an adaptive receive diversity disallowed mode satisfying a first downlink burst threshold. The disallowed communication component 730 may be configured as or otherwise support a means for communicating, during a second duration, according to the adaptive receive diversity disallowed mode based on a transition condition being satisfied by communications during the first duration. In some examples, the standby communication component 725 may be configured as or otherwise support a means for communicating, during a third duration, according to the adaptive receive diversity standby mode based on a second set of downlink bursts received during the second duration satisfying a second downlink burst threshold, where the second downlink burst threshold is based on a function of a downlink scheduling rate monitored while communicating according to the adaptive receive diversity standby mode during the first duration.

In some examples, the wireless link monitoring component 735 may be configured as or otherwise support a means for monitoring, during the first duration and while communicating according to the adaptive receive diversity standby mode, for receipt of a multi-input-multi-output (MIMO) downlink grant and the downlink scheduling rate. In some examples, the controller component 740 may be configured as or otherwise support a means for adjusting the first downlink burst threshold to the second downlink burst threshold based on receipt of the MIMO downlink grant or the function of the downlink scheduling rate.

In some examples, the controller component 740 may be configured as or otherwise support a means for recording, based on transitioning from communicating during the first duration to communicating during the second duration, a downlink scheduling rate monitored while communicating according to the adaptive receive diversity standby mode during the first duration.

In some examples, the controller component 740 may be configured as or otherwise support a means for determining whether a downlink scheduling rate of a quantity of previous durations of communicating according to the adaptive receive diversity standby mode satisfies a downlink scheduling rate threshold.

In some examples, the controller component 740 may be configured as or otherwise support a means for determining, based on determining that the downlink scheduling rate of the quantity of previous durations is less than or equal to the downlink scheduling rate threshold, whether a downlink burst adjustment condition is satisfied.

In some examples, to support adjusting the first downlink burst threshold to the second downlink burst threshold, the controller component 740 may be configured as or otherwise support a means for adjusting the first downlink burst threshold based on determining that the downlink burst adjustment condition is satisfied, where adjusting the first downlink burst threshold results in the second downlink burst threshold, and where the downlink burst adjustment condition is satisfied based on a set of additional downlink bursts received while communicating during the first duration being less than or equal to a threshold percentage of a window size including a set of transmission time intervals.

In some examples, to support adjusting the first downlink burst threshold to the second downlink burst threshold, the controller component 740 may be configured as or otherwise support a means for using a value of the first downlink burst threshold as the value of the second downlink burst threshold based on determining that the downlink burst adjustment condition is not satisfied, where the downlink burst adjustment condition is not satisfied based on a set of additional downlink bursts received while communicating during the first duration being greater than a threshold percentage of a window size including a set of transmission time intervals.

In some examples, to support adjusting the first downlink burst threshold to the second downlink burst threshold, the controller component 740 may be configured as or otherwise support a means for resetting the first downlink burst threshold to a default downlink burst threshold based on determining the downlink scheduling rate of the quantity of previous durations fails to satisfy the downlink burst adjustment condition, where resetting the first downlink burst threshold to the default downlink burst threshold results in the second downlink burst threshold and where the downlink burst adjustment condition is not satisfied based on the downlink scheduling rate being greater than an downlink scheduling rate threshold percentage.

In some examples, the controller component 740 may be configured as or otherwise support a means for resetting, based on receiving the multi-layer MIMO downlink grant or a signal-to-noise ratio threshold being satisfied, a downlink scheduling rate corresponding to a quantity of previous durations of communicating according to the adaptive receive diversity standby mode.

In some examples, the channel measurement component 745 may be configured as or otherwise support a means for determining the signal-to-noise ratio threshold based on a quantity of active radio frequency receive chains at the UE.

In some examples, the UE activates a first quantity of radio frequency receive chains in response to communicating according to the adaptive receive diversity standby mode. In some examples, the first quantity of radio frequency receive chains is associated with an increased (e.g., maximum) performance of the UE.

In some examples, the UE activates a second quantity of radio frequency receive chains in response with communicating according to the adaptive receive diversity disallowed mode. In some examples, the second quantity of radio frequency receive chains is associated with a baseline performance of the UE.

In some examples, the controller component 740 may be configured as or otherwise support a means for evaluating whether the transition condition is satisfied based on a scheduling criteria monitored during a quantity of transmission time intervals while communicating according to the adaptive receive diversity standby mode.

In some examples, the scheduling criteria is based on the downlink scheduling rate over the quantity of transmission time intervals or a quantity of downlink grants received over the quantity of transmission time intervals.

In some examples, the function of the downlink scheduling rate is a downlink scheduling rate, a variance of the downlink scheduling rate, or both.

Figure 8:
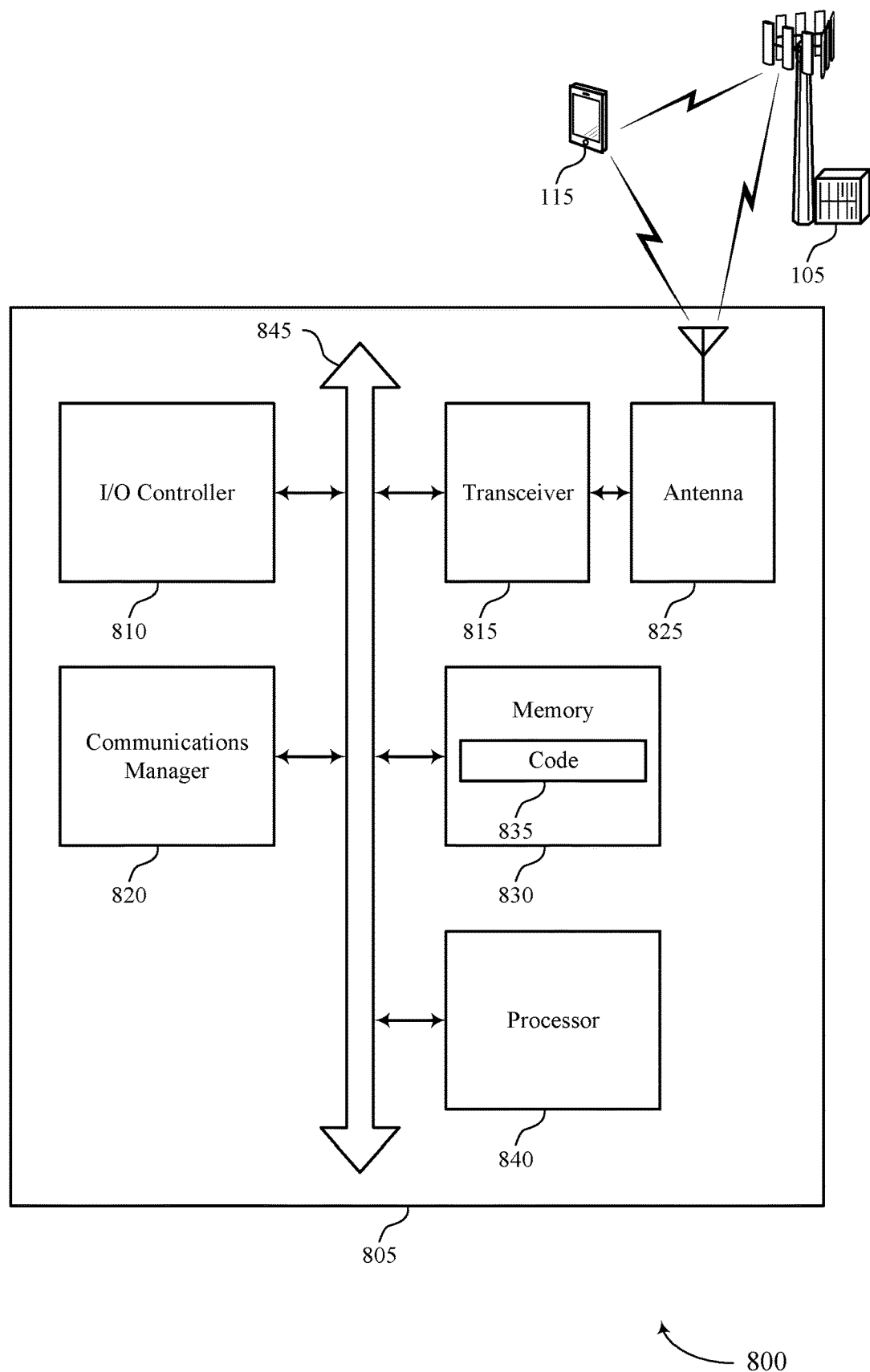
FIG. 8 shows a diagram of a system including a device that supports adaptive advanced receivers based on downlink grant pattern detection in accordance with one or more aspects of the present disclosure.

FIG. 8 shows a diagram of a system 800 including a device 805 that supports adaptive advanced receivers based on downlink grant pattern detection in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting adaptive advanced receivers based on downlink grant pattern detection). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for communicating, during a first duration, according to an adaptive receive diversity standby mode based on a first set of downlink bursts received while communicating according to an adaptive receive diversity disallowed mode satisfying a first downlink burst threshold. The communications manager 820 may be configured as or otherwise support a means for communicating, during a second duration, according to the adaptive receive diversity disallowed mode based on a transition condition being satisfied by communications during the first duration. The communications manager 820 may be configured as or otherwise support a means for communicating, during a third duration, according to the adaptive receive diversity standby mode based on a second set of downlink bursts received during the second duration satisfying a second downlink burst threshold, where the second downlink burst threshold is based on a function of a downlink scheduling rate monitored while communicating according to the adaptive receive diversity standby mode during the first duration.

By including or configuring the communications manager 820 in accordance with examples as described herein, the device 805 may support techniques for adaptively adjusting ARD transition criteria, thereby reducing power consumption of a wireless device while maintaining a same downlink throughput.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of adaptive advanced receivers based on downlink grant pattern detection as described herein, or the processor 840 and the memory 830 may be otherwise configured to perform or support such operations.

Figure 9:
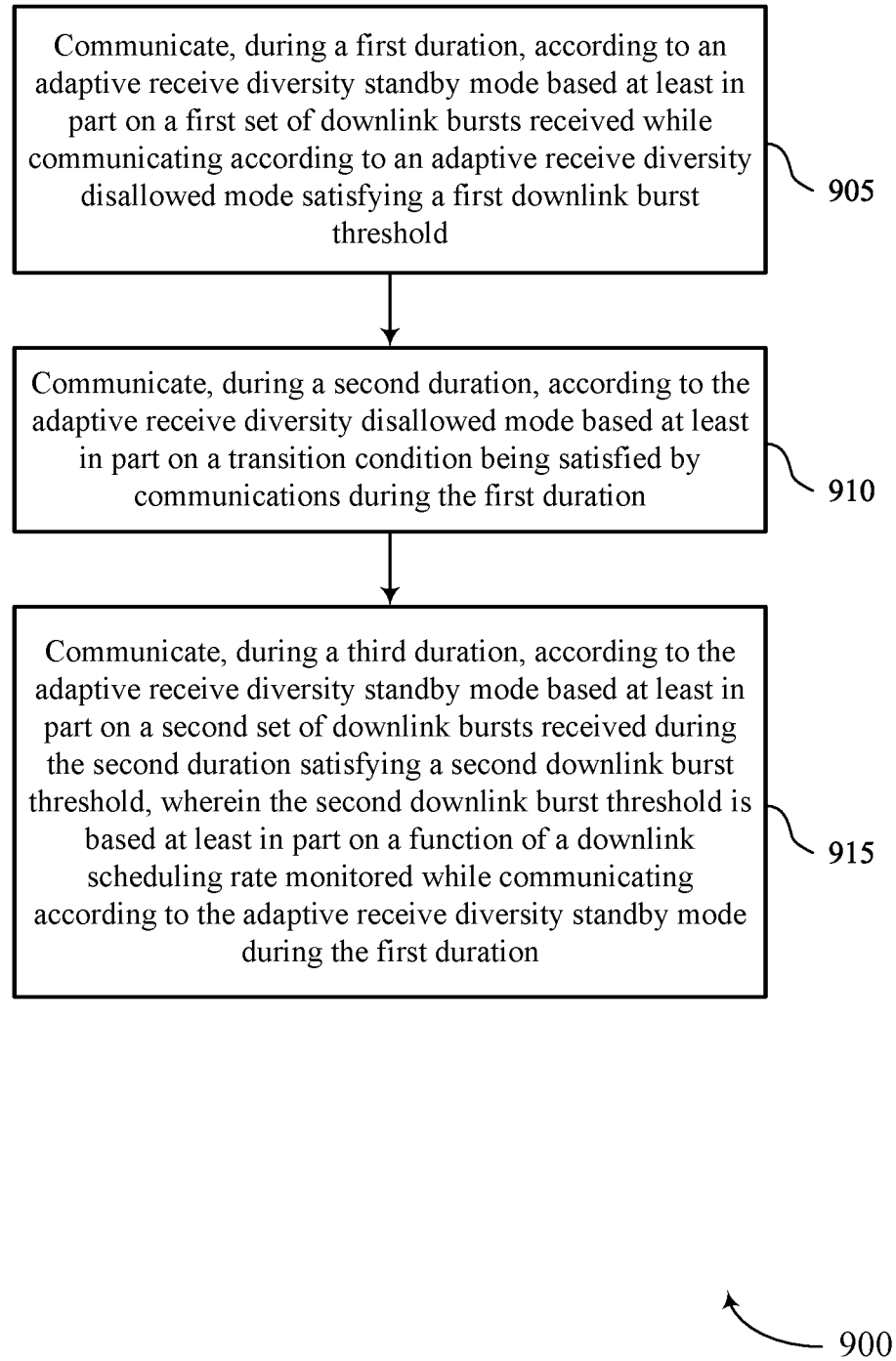
FIG. 9 shows a flowchart illustrating methods that support adaptive advanced receivers based on downlink grant pattern detection in accordance with one or more aspects of the present disclosure.

FIG. 9 shows a flowchart illustrating a method 900 that supports adaptive advanced receivers based on downlink grant pattern detection in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include communicating, during a first duration, according to an adaptive receive diversity standby mode based on a first set of downlink bursts received while communicating according to an adaptive receive diversity disallowed mode satisfying a first downlink burst threshold. The operations of 905 may be performed in accordance with examples as disclosed herein. In some examples, aspects of the operations of 905 may be performed by a standby communication component 725 as described with reference to FIG. 7.

At 910, the method may include communicating, during a second duration, according to the adaptive receive diversity disallowed mode based on a transition condition being satisfied by communications during the first duration. The operations of 910 may be performed in accordance with examples as disclosed herein. In some examples, aspects of the operations of 910 may be performed by a disallowed communication component 730 as described with reference to FIG. 7.

At 915, the method may include communicating, during a third duration, according to the adaptive receive diversity standby mode based on a second set of downlink bursts received during the second duration satisfying a second downlink burst threshold, where the second downlink burst threshold is based on a function of a downlink scheduling rate monitored while communicating according to the adaptive receive diversity standby mode during the first duration. The operations of 915 may be performed in accordance with examples as disclosed herein. In some examples, aspects of the operations of 915 may be performed by a standby communication component 725 as described with reference to FIG. 7.

The following provides an overview of aspects of the present disclosure:

Aspect 1: A method for wireless communications at a UE, comprising: communicating, during a first duration, according to an adaptive receive diversity standby mode based at least in part on a first set of downlink bursts received while communicating according to an adaptive receive diversity disallowed mode satisfying a first downlink burst threshold; communicating, during a second duration, according to the adaptive receive diversity disallowed mode based at least in part on a transition condition being satisfied by communications during the first duration; and communicating, during a third duration, according to the adaptive receive diversity standby mode based at least in part on a second set of downlink bursts received during the second duration satisfying a second downlink burst threshold, wherein the second downlink burst threshold is based at least in part on a function of a downlink scheduling rate monitored while communicating according to the adaptive receive diversity standby mode during the first duration.

Aspect 2: The method of aspect 1, further comprising: monitoring, during the first duration and while communicating according to the adaptive receive diversity standby mode, for receipt of a multi-input-multi-output (MIMO) downlink grant and the downlink scheduling rate; and adjusting the first downlink burst threshold to the second downlink burst threshold based at least in part on receipt of the MIMO downlink grant or the function of the downlink scheduling rate.

Aspect 3: The method of aspect 2, further comprising: recording, based at least in part on transitioning from communicating during the first duration to communicating during the second duration, a downlink scheduling rate monitored while communicating according to the adaptive receive diversity standby mode during the first duration.

Aspect 4: The method of any of aspects 2 through 3, further comprising: determining whether a downlink scheduling rate of a quantity of previous durations of communicating according to the adaptive receive diversity standby mode satisfies a downlink scheduling rate threshold.

Aspect 5: The method of aspect 4, further comprising: determining, based at least in part on determining that the average downlink scheduling rate of the quantity of previous durations is less than or equal to the average downlink scheduling rate threshold, whether a downlink burst adjustment condition is satisfied.

Aspect 6: The method of aspect 5, wherein adjusting the first downlink burst threshold to the second downlink burst threshold comprises: adjusting the first downlink burst threshold based at least in part on determining that the downlink burst adjustment condition is satisfied, wherein adjusting the first downlink burst threshold results in the second downlink burst threshold, and wherein the downlink burst adjustment condition is satisfied based at least in part on a set of additional downlink bursts received while communicating during the first duration being less than or equal to a threshold percentage of a window size comprising a set of transmission time intervals.

Aspect 7: The method of aspect 5, wherein adjusting the first downlink burst threshold to the second downlink burst threshold comprises: using a value of the first downlink burst threshold as the value of the second downlink burst threshold based at least in part on determining that the downlink burst adjustment condition is not satisfied, wherein the downlink burst adjustment condition is not satisfied based at least in part on a set of additional downlink bursts received while communicating during the first duration being greater than a threshold percentage of a window size comprising a set of transmission time intervals.

Aspect 8: The method of 5, wherein adjusting the first downlink burst threshold to the second downlink burst threshold comprises: resetting the first downlink burst threshold to a default downlink burst threshold based at least in part on determining the downlink scheduling rate of the quantity of previous durations fails to satisfy the downlink burst adjustment condition, wherein resetting the first downlink burst threshold to the default downlink burst threshold results in the second downlink burst threshold and wherein the downlink burst adjustment condition is not satisfied based at least in part on the downlink scheduling rate being greater than a downlink scheduling rate threshold percentage.

Aspect 9: The method of any of aspect 2, further comprising: resetting, based at least in part on receiving the multi-layer MIMO downlink grant or a signal-to-noise ratio threshold being satisfied, a downlink scheduling rate corresponding to a quantity of previous durations of communicating according to the adaptive receive diversity standby mode.

Aspect 10: The method of aspect 9, further comprising: determining the signal-to-noise ratio threshold based at least in part on a quantity of active radio frequency receive chains at the UE.

Aspect 11: The method of any of aspects 1 through 10, wherein the UE activates a first quantity of radio frequency receive chains in response to communicating according to the adaptive receive diversity standby mode, the first quantity of radio frequency receive chains is associated with an increased (e.g., maximum) performance of the UE.

Aspect 12: The method of any of aspects 1 through 10, wherein the UE activates a second quantity of radio frequency receive chains in response with communicating according to the adaptive receive diversity disallowed mode, the second quantity of radio frequency receive chains is associated with a baseline performance of the UE.

Aspect 13: The method of any of aspects 1 through 12, further comprising: evaluating whether the transition condition is satisfied based at least in part on a scheduling criteria monitored during a quantity of transmission time intervals while communicating according to the adaptive receive diversity standby mode.

Aspect 14: The method of aspect 13, wherein the scheduling criteria is based at least in part on the downlink scheduling rate over the quantity of transmission time intervals or a quantity of downlink grants received over the quantity of transmission time intervals.

Aspect 15: The method of any of aspects 1 through 14, wherein the function of the downlink scheduling rate is an average of the downlink scheduling rate, a variance of the downlink scheduling rate, or both.

Aspect 16: An apparatus for wireless communications at a UE, comprising a processor; memory coupled with the processor; and instructions stored in the memory and executable by the processor to cause the apparatus to perform a method of any of aspects 1 through 15.

Aspect 17: An apparatus for wireless communications at a UE, comprising at least one means for performing a method of any of aspects 1 through 15.

Aspect 18: A non-transitory computer-readable medium storing code for wireless communications at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a processor;
memory coupled with the processor; and
instructions stored in the memory and executable by the processor to cause the apparatus to:
communicate, during a first duration, according to an adaptive receive diversity standby mode based at least in part on a first set of downlink bursts received while communicating according to an adaptive receive diversity disallowed mode satisfying a first downlink burst threshold;
communicate, during a second duration, according to the adaptive receive diversity disallowed mode based at least in part on a transition condition being satisfied by communications during the first duration; and
communicate, during a third duration, according to the adaptive receive diversity standby mode based at least in part on a second set of downlink bursts received during the second duration satisfying a second downlink burst threshold, wherein the second downlink burst threshold is based at least in part on a function of a downlink scheduling rate monitored while communicating according to the adaptive receive diversity standby mode during the first duration.

2. The apparatus of claim 1, wherein the instructions are further executable by the processor to cause the apparatus to:
monitor, during the first duration and while communicating according to the adaptive receive diversity standby mode, for receipt of a multi-input-multi-output (MIMO) downlink grant and the downlink scheduling rate; and
adjust the first downlink burst threshold to the second downlink burst threshold based at least in part on receipt of the MIMO downlink grant or the function of the downlink scheduling rate.

3. The apparatus of claim 2, wherein the instructions are further executable by the processor to cause the apparatus to:
record, based at least in part on transitioning from communicating during the first duration to communicating during the second duration, a downlink scheduling rate monitored while communicating according to the adaptive receive diversity standby mode during the first duration.

4. The apparatus of claim 2, wherein the instructions are further executable by the processor to cause the apparatus to:
determine whether a downlink scheduling rate of a quantity of previous durations of communicating according to the adaptive receive diversity standby mode satisfies a downlink scheduling rate threshold.

5. The apparatus of claim 4, wherein the instructions are further executable by the processor to cause the apparatus to:
determine, based at least in part on determining that the downlink scheduling rate of the quantity of previous durations is less than or equal to the downlink scheduling rate threshold, whether a downlink burst adjustment condition is satisfied.

6. The apparatus of claim 5, wherein the instructions to adjust the first downlink burst threshold to the second downlink burst threshold are executable by the processor to cause the apparatus to:
adjust the first downlink burst threshold based at least in part on determining that the downlink burst adjustment condition is satisfied, wherein adjusting the first downlink burst threshold results in the second downlink burst threshold, and wherein the downlink burst adjustment condition is satisfied based at least in part on a set of additional downlink bursts received while communicating during the first duration being less than or equal to a threshold percentage of a window size comprising a set of transmission time intervals.

7. The apparatus of claim 5, wherein the instructions to adjust the first downlink burst threshold to the second downlink burst threshold are executable by the processor to cause the apparatus to:
use a value of the first downlink burst threshold as the value of the second downlink burst threshold based at least in part on determining that the downlink burst adjustment condition is not satisfied, wherein the downlink burst adjustment condition is not satisfied based at least in part on a set of additional downlink bursts received while communicating during the first duration being greater than a threshold percentage of a window size comprising a set of transmission time intervals.

8. The apparatus of claim 5, wherein the instructions to adjust the first downlink burst threshold to the second downlink burst threshold are executable by the processor to cause the apparatus to:
reset the first downlink burst threshold to a default downlink burst threshold based at least in part on determining the downlink scheduling rate of the quantity of previous durations fails to satisfy the downlink burst adjustment condition, wherein resetting the first downlink burst threshold to the default downlink burst threshold results in the second downlink burst threshold and wherein the downlink burst adjustment condition is not satisfied based at least in part on the downlink scheduling rate being greater than a downlink scheduling rate threshold percentage.

9. The apparatus of claim 2, wherein the instructions are further executable by the processor to cause the apparatus to:
reset, based at least in part on receiving the multi-layer MIMO downlink grant or a signal-to-noise ratio threshold being satisfied, a downlink scheduling rate corresponding to a quantity of previous durations of communicating according to the adaptive receive diversity standby mode.

10. The apparatus of claim 9, wherein the instructions are further executable by the processor to cause the apparatus to:
determine the signal-to-noise ratio threshold based at least in part on a quantity of active radio frequency receive chains at the UE.

11. The apparatus of claim 1, wherein:
the UE activates a first quantity of radio frequency receive chains in response to communicating according to the adaptive receive diversity standby mode, and the first quantity of radio frequency receive chains is associated with a increased performance of the UE.

12. The apparatus of claim 1, wherein:
the UE activates a second quantity of radio frequency receive chains in response with communicating according to the adaptive receive diversity disallowed mode, and
the second quantity of radio frequency receive chains is associated with a baseline performance of the UE.

13. The apparatus of claim 1, wherein the instructions are further executable by the processor to cause the apparatus to:
evaluate whether the transition condition is satisfied based at least in part on a scheduling criteria monitored during a quantity of transmission time intervals while communicating according to the adaptive receive diversity standby mode.

14. The apparatus of claim 13, wherein the scheduling criteria is based at least in part on the downlink scheduling rate over the quantity of transmission time intervals or a quantity of downlink grants received over the quantity of transmission time intervals.

15. The apparatus of claim 1, wherein the function of the downlink scheduling rate is an average of the downlink scheduling rate, a variance of the downlink scheduling rate, or both.

16. A method for wireless communications at a user equipment (UE), comprising:
communicating, during a first duration, according to an adaptive receive diversity standby mode based at least in part on a first set of downlink bursts received while communicating according to an adaptive receive diversity disallowed mode satisfying a first downlink burst threshold;
communicating, during a second duration, according to the adaptive receive diversity disallowed mode based at least in part on a transition condition being satisfied by communications during the first duration; and
communicating, during a third duration, according to the adaptive receive diversity standby mode based at least in part on a second set of downlink bursts received during the second duration satisfying a second downlink burst threshold, wherein the second downlink burst threshold is based at least in part on a function of a downlink scheduling rate monitored while communicating according to the adaptive receive diversity standby mode during the first duration.

17. The method of claim 16, further comprising:
monitoring, during the first duration and while communicating according to the adaptive receive diversity standby mode, for receipt of a multi-input-multi-output (MIMO) downlink grant and the downlink scheduling rate; and
adjusting the first downlink burst threshold to the second downlink burst threshold based at least in part on receipt of the MIMO downlink grant or the function of the downlink scheduling rate.

18. The method of claim 17, further comprising:
recording, based at least in part on transitioning from communicating during the first duration to communicating during the second duration, the downlink scheduling rate monitored while communicating according to the adaptive receive diversity standby mode during the first duration.

19. The method of claim 17, further comprising:
determining whether a downlink scheduling rate of a quantity of previous durations of communicating according to the adaptive receive diversity standby mode satisfies a downlink scheduling rate threshold.

20. A non-transitory computer-readable medium storing code for wireless communications at a user equipment (UE), the code comprising instructions executable by a processor to:
communicate, during a first duration, according to an adaptive receive diversity standby mode based at least in part on a first set of downlink bursts received while communicating according to an adaptive receive diversity disallowed mode satisfying a first downlink burst threshold;
communicate, during a second duration, according to the adaptive receive diversity disallowed mode based at least in part on a transition condition being satisfied by communications during the first duration; and
communicate, during a third duration, according to the adaptive receive diversity standby mode based at least in part on a second set of downlink bursts received during the second duration satisfying a second downlink burst threshold, wherein the second downlink burst threshold is based at least in part on a function of a downlink scheduling rate monitored while communicating according to the adaptive receive diversity standby mode during the first duration.

* * * * *